G. S. STUART.
EMERGENCY DEVICE FOR USE WITH AUTOMOBILES.
APPLICATION FILED JAN. 7, 1920.
1,379,485. Patented May 24, 1921.
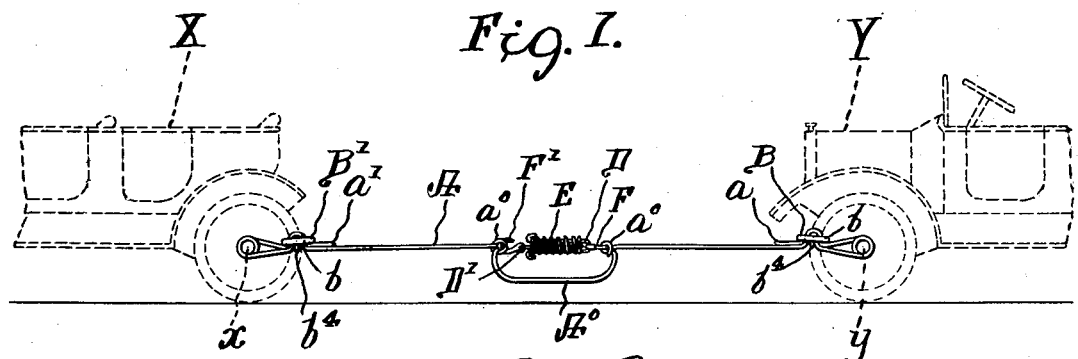
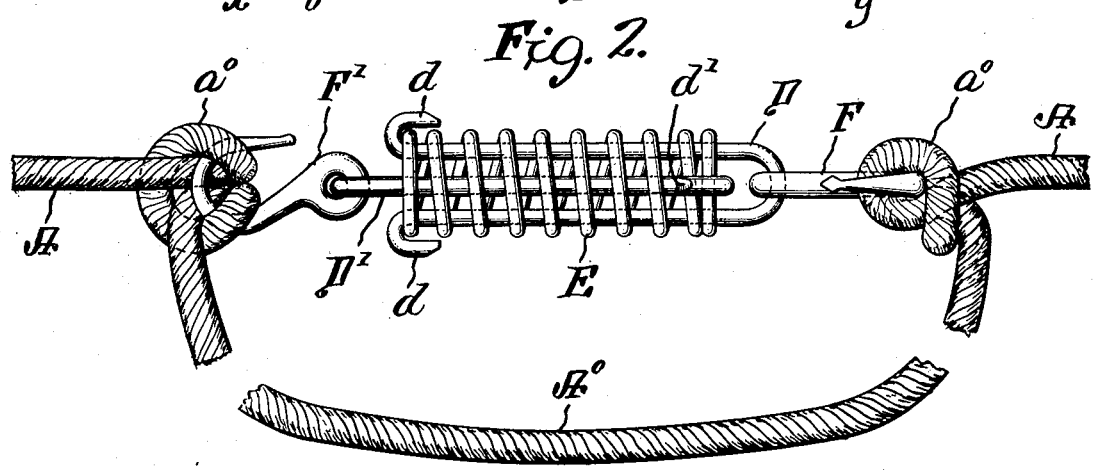
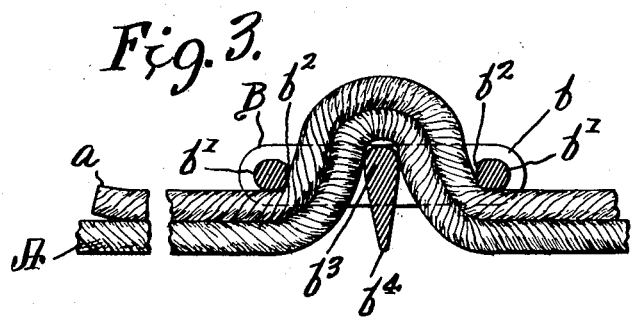
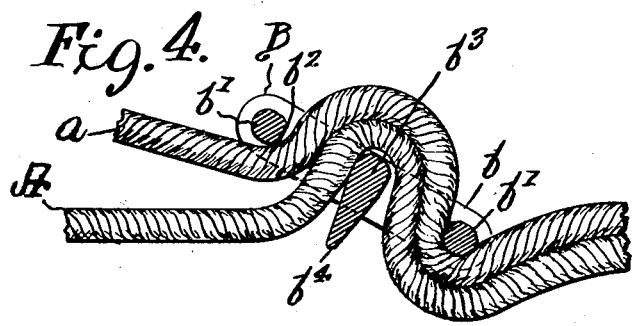
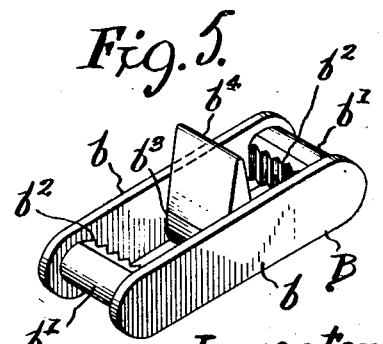
Inventor:
George S. Stuart.
by Williamson & Giusta,
Attorneys.

G. S. STUART.
EMERGENCY DEVICE FOR USE WITH AUTOMOBILES.
APPLICATION FILED JAN. 7, 1920.
1,379,485.
Patented May 24, 1921.
2 SHEETS—SHEET 2.
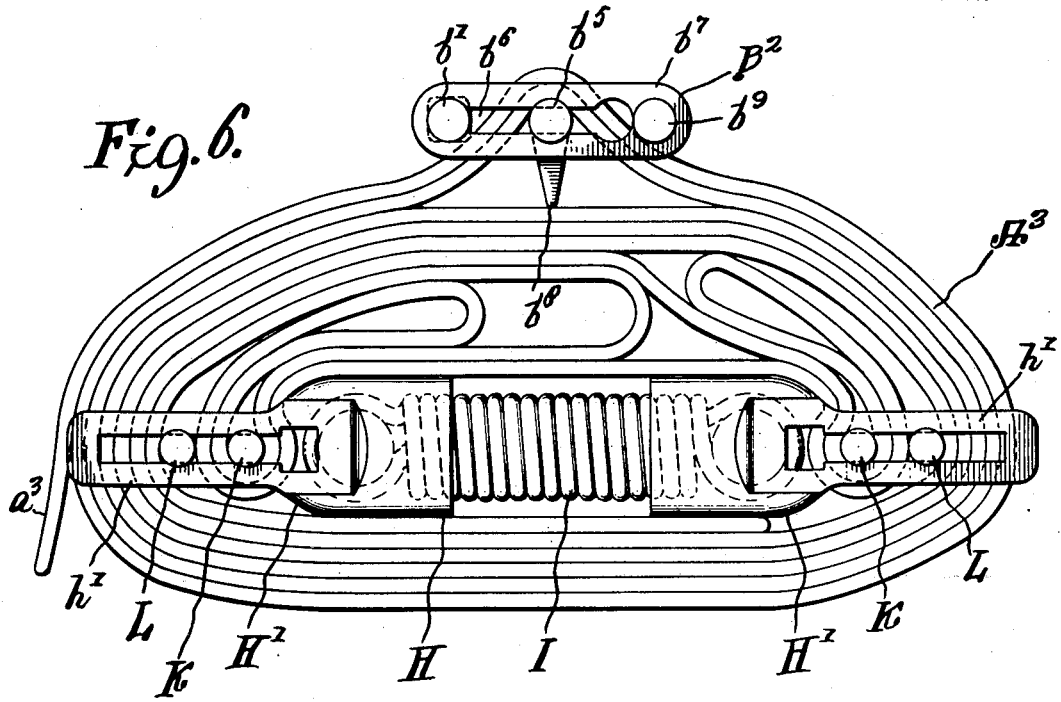
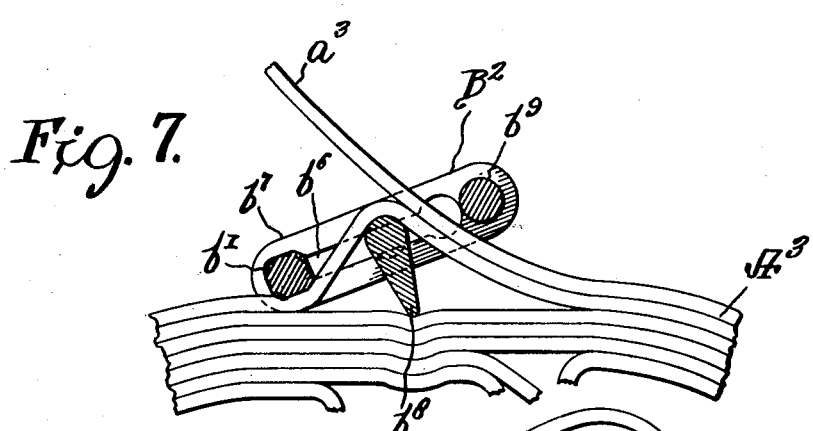
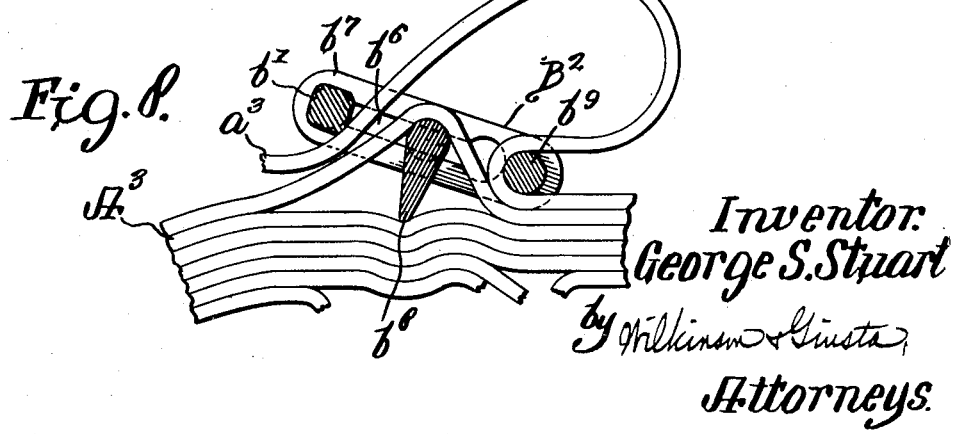
Inventor:
George S. Stuart
by Wilkinson & Ginsta
Attorneys.

UNITED STATES PATENT OFFICE.

GEORGE S. STUART, OF BRADFORD, PENNSYLVANIA.

EMERGENCY DEVICE FOR USE WITH AUTOMOBILES.

1,379,485.     Specification of Letters Patent.    Patented May 24, 1921.

Application filed January 7, 1920. Serial No. 350,000.

*To all whom it may concern:*

Be it known that I, GEORGE S. STUART, a citizen of the United States, residing at Bradford, in the county of McKean and State of Pennsylvania, have invented certain new and useful Improvements in Emergency Devices for Use with Automobiles; and I do hereby declare the following to be a full, clear, and exact description of the invention, such as will enable others skilled in the art to which it appertains to make and use the same.

My present invention is intended to provide an emergency device in the form of a rope, chain, wire cable, or flexible band, with the attachments hereinafter described, which may be conveniently rolled up and carried in a small space in an automobile, and may be used for the various purposes hereinafter stated and others for which it may be especially adapted.

According to my present invention I provide a flexible connector which may be made of rope, chain, leather or other suitable textile fabric, to which I attach suitable clasps, and to which may be attached a suitable spring buffer arrangement to take up the shock of any strains suddenly imposed upon said connector.

My present invention relates more especially to a modification of the apparatus described and claimed in my U. S. Patent, No. 1,325,422, granted December 16, 1919, and entitled Emergency device for use with automobiles.

My invention will be more fully understood after reference to the accompanying drawings, in which like parts are indicated by similar reference symbols throughout the several views, and in which:—

Figure 1 is a side elevation of the device as used for towing one automobile by means of another, the automobiles being indicated in dotted lines, the towing device being shown on a larger scale than the automobiles for the sake of clearness in the drawings.

Fig. 2 is a detail showing on a larger scale a suitable shock absorber arrangement used in connection with the device.

Fig. 3 shows the clasp arrangement for attaching one end of the towing line to one of the automobiles.

Fig. 4 shows the clasp tilted, and illustrates the manner of reeving the free end of the towing line through the clasp so as to fasten the same securely.

Fig. 5 is a detail showing in perspective one of the clasps used for attaching the respective ends of the towing lines to the corresponding automobiles.

In Figs. 1 to 4 the towing line is illustrated in the form of a rope; in Figs. 6 to 8 the towing line is indicated in the form of a flat band of textile fabric, leather, rubber, or the like;

Fig. 6 shows the towing line wound in a coil for storage in an automobile, and illustrates a modified form of shock absorber arrangement, the same being somewhat similar to that illustrated in my patent aforesaid; and Figs. 7 and 8 are details showing the method of reeving the free end of the towing line through the clasp.

Referring to Fig. 1, X represents the towing automobile and Y represents the automobile being towed, the two being connected by the emergency device shown in full lines in said figure. This emergency device comprises a flexible connector which may be in the form of a rope, as shown in Figs. 1 to 4, or a chain or a flat band as shown in Figs. 6 to 8. This rope, shown at A in Fig. 1, has its free ends wrapped around the axles $x$, $y$, or other part of the framework of the automobile, and one of the free ends $a$ is rove through the clasp B, and the other free end $a'$ is rove through the clasp B', the two clasps B and B' being preferably of similar construction, shown in detail in Fig. 5.

The two clasps are preferably provided with parallel side bars $b$ connected together by the studs $b'$, at each end thereof, which studs are preferably corrugated or roughened on their inner faces, as at $b^2$, so as to better grip the flexible connector.

Midway between the studs $b'$, and preferably cast integral with the side bars $b$, is the central stud $b^3$, having the projecting tongue $b^4$, which central stud serves as an abutment to bind the flexible connector in the clasp, and the tongue $b^4$ serves as a pivot to facilitate the reeving of the free end of the flexible connector through the said clasp, as shown more clearly in Figs. 7 and 8, and as will be hereinafter more fully described in connection with a tow line of the character described.

A suitable shock absorber is required, such for instance as is shown in Figs. 1 and 2, in which D and D' are two metal loops having their ends $d$ and $d'$ bent over to form hooks, into which hooks the coil spring E engages. To these loops D and D' the hooks or rings F and F' are connected, and a bight or loop A° is formed in the line A by securing the said line to the said hooks in any convenient way, as by the clove hitches $a°$ shown in Figs. 1 and 2.

It will be seen that if any sudden pressure be brought on the line A the spring E will yield, acting as a shock absorber.

Instead of the shock absorber shown in Figs. 1 and 2, I may use any suitable shock absorber, such, for instance, as that indicated at H in Fig. 6, in which there are two heads H' connected together by the coil spring or springs I. Each of these heads is provided with a pair of slotted arms $h'$, into which slots the holding studs K and L project, similar to those already described in my patent aforesaid. These arms $h'$ also serve as guides between which the folds of the line may be wound, as shown in Fig. 6.

When in use the free ends of the line are wrapped around the axles or other parts of the automobiles, as shown in Fig. 1, and secured by suitable clasps, such as B in Fig. 1, or $B^2$ in Figs. 6, 7 and 8. In order to keep the free end of the line from unwinding when coiled compactly, as shown in Fig. 6, this free end may be rove through one of the clasps as shown at the top of said figure. This clasp may be of the form shown in Fig. 5, but a slight modification is shown in Figs. 6, 7 and 8, in that the ends $b^5$ of the central stud slide in the slot $b^6$ in the side bars $b^7$, and the tongue $b^8$ projects outward laterally, as already described in connection with the tongue $b^4$.

One of the end studs $b^9$ is also shown as round instead of corrugated as in the former figures, but the operation of the clasp is the same in connection with any or all of the figures referred to. This projecting tongue of the central stud as hereinbefore described forms a convenient means for facilitating the reeving of the free end of the line through the clasp. For instance, by tilting the left end of the clasp downward, as shown in Fig. 7, an open throat is provided near the upper end of the clasp which will permit the easy insertion of the free end $a^3$ of the line $A^3$, and tilting the clasp in the opposite direction, as shown in Fig. 8, will provide an open throat for the easy insertion of the said line through the other end of the clasp. This greatly facilitates the reeving of the free end of the line through the clasp. It has been found in practice extremely difficult, and sometimes impracticable, to reeve the free end of a stiff line, or belt, or band through a clasp of the general character of the herein described, but omitting the tongue mentioned.

While I have illustrated and described the device as especially adapted for use in towing a vehicle out of a mudhole, or towing the same when disabled, it will be obvious that the herein described line or flexible connector may be used for other purposes, such as packing trunks or boxes on automobiles, or the like; or that the device may be used for other purposes when straps or ropes or the like are required.

Thus it will be seen that I provide a simple device which may be compactly assembled and stored in the tool chest or other convenient place on an automobile, and may be readily put into use when emergency requires it.

It will be obvious that various modifications might be made in the herein described apparatus, and in the combination and arrangement of parts which could be used without departing from the spirit of my invention; and I do not mean to limit the invention to such details except as particularly pointed out in the claim.

Having thus described my invention what I claim and desire to secure by Letters Patent of the United States is:—

A towing device comprising a single continuous flexible connector having free ends adapted to be folded over and to engage, respectively, a part of the framework of the towing and the towed vehicle, clasps carried by the said connector near the free ends thereof and adapted to engage the said free ends respectively, said clasp having side bars, transversely disposed end studs spanning said bars, and an intermediate lug having a laterally projecting tongue, a loop provided in said connector intermediate of said clasps, and a spring buffer arrangement spanning said loop and serving as a shock absorber to the device, substantially as described.

GEORGE S. STUART.